May 22, 1923.

Re. 15,611

H. DE SMITH

SAFETY OPERATING MECHANISM

Original Filed July 3, 1919

3 Sheets-Sheet 1

INVENTOR.

BY

ATTORNEY.

May 22, 1923. Re. 15,611

H. DE SMITH

SAFETY OPERATING MECHANISM

Original Filed July 3, 1919 3 Sheets-Sheet 2

INVENTOR.

BY

ATTORNEY.

May 22, 1923. Re. 15,611

H. DE SMITH

SAFETY OPERATING MECHANISM

Original Filed July 3, 1919 3 Sheets-Sheet 3

INVENTOR.

BY Henry De Smith

Chas. F. Burns

ATTORNEY.

Reissued May 22, 1923.

Re. 15,611

UNITED STATES PATENT OFFICE.

HENRY DE SMITH, OF ROCHESTER, NEW YORK, ASSIGNOR TO M. D. KNOWLTON COMPANY, OF ROCHESTER, NEW YORK, A CORPORATION OF NEW YORK.

SAFETY OPERATING MECHANISM.

Original No. 1,354,895, dated October 5, 1920, Serial No. 308,608, filed July 3, 1919. Application for reissue filed October 25, 1921. Serial No. 510,400.

*To all whom it may concern:*

Be it known that I, HENRY DE SMITH, a citizen of the United States, and resident of Rochester, in the county of Monroe and State of New York, have invented certain new and useful Improvements in Safety Operating Mechanism, of which the following is a specification.

This invention relates to safety operating mechanism for box making or other machines which employ a movable presser member, and has for its object to provide an improved safety operating mechanism designed to preclude the possibility of the operator's hand or fingers becoming injured by the presser member during the operation of the machine.

The invention, while applicable to machines of various kinds, is here shown as incorporated in the box-form of a box-ending machine. In these machines, the box-form is mounted on a reciprocating carrier and is caused to co-operate with a stationary presser member to press an interposed end blank onto the end flanges of a box blank carried by the form. In accordance with the preferred form of my invention here shown, the box-form is made in two sections, one being adapted to be rigidly connected to the form carrier and the other being movable relatively thereto. Associated with this sectional form are automatic means which are normally operative to maintain the outer or presser section in yielding relation to the other until just prior to the form reaching a position for pressing engagement with the work, and to then effect a positive connection between the sections to hold the presser one in fixed or unyielding relation to the other. Thus, if any obstruction, such as the operator's hand or fingers, is encountered during the working stroke of the form, no harm will be done as the outer or presser section of the form at that time is in yielding relation to the other section and its actuating means. If, however, no obstruction lies in the path of the moving form, the automatic means will operate to render the presser section unyielding relatively to the other just before it reaches its work-pressing position and so cause it to perform its work-pressing function.

Referring now to the accompanying drawings—

Figures 1, 8:
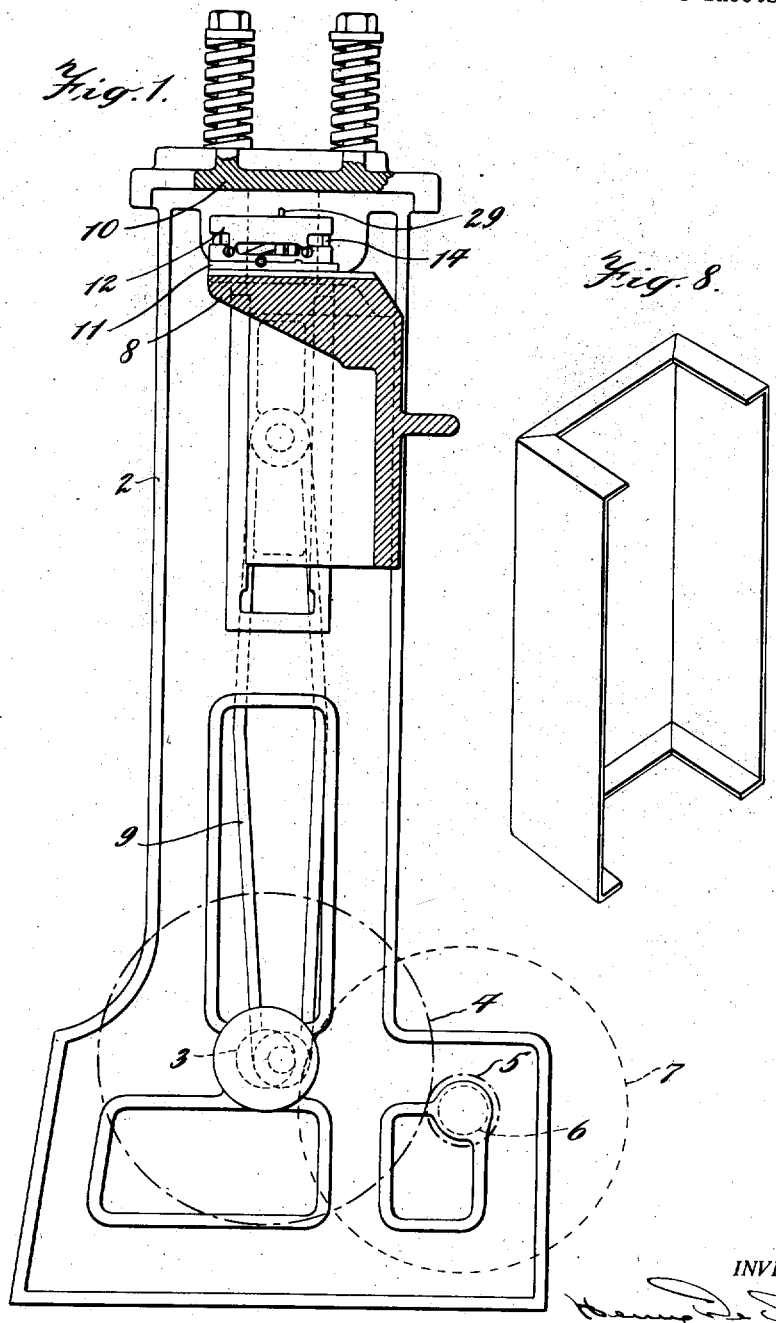
Fig. 1 is a sectional side elevation of a box-ending machine having a box-form embodying my invention mounted on the reciprocating carrier thereof.
Fig. 8 is a perspective view of a box blank as it appears prior to having the ends applied thereto.

The box-ending machine here shown is of substantially usual construction and comprises a frame 2 in which is journalled a crank shaft 3 connected through suitable gearing 4—5 with a drive-shaft 6 carrying a belt-pulley 7. Connected with the frame 2 for vertical reciprocation is a box-form carrier 8 which is actuated from the crank shaft 3 through a pitman connection 9. In the operation of the machine, a box blank having inwardly turned flanges, such as shown in Fig. 8, is placed on the box-form with the flanges at one end resting upon the top of the form. An end blank is then fed by the machine in usual manner to a position on top of these flanges, after which the form is raised to co-operate with the upper head or presser member 10 of the machine to press the end blank onto the box flanges, a suitable adhesive previously applied to one or both of said parts causing them to firmly adhere when thus pressed together. In manipulating the work in the operation of these macines, it sometimes happens that the operator gets his hand or fingers caught between the top of the box-form and the co-operating presser member 10, with resulting injury to them. To prevent the possibility of this has been the purpose of the present invention.

Figure 3:
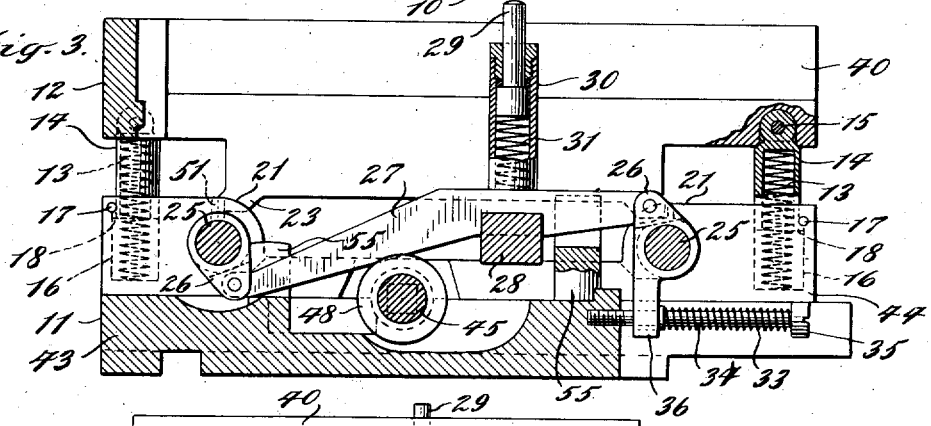
Fig. 3 is a vertical section through the same taken on the line 3—3 of Fig. 2.

The box-form comprises two main sections, the lower one, indicated at 11, being adapted to be rigidly attached to the carrier 8 in any usual or suitable manner, and the upper section, indicated at 12, being adapted for the direct support of the box blank. The upper section 12, which is made up of adustable parts as will hereinafter be described, is yieldingly supported in a normally elevated position above the lower one by means of springs 13 located at the four corners thereof. As a means for guiding the upper section when moved vertically relatively to the lower one, as permitted by these springs, guide-pins 14 are provided at the four corners of the form which are attached at their upper ends to the upper section by suitable fastening means, such as the screws 15, and at their lower ends extend and work in guide openings 16 in the lower section. As a means to limit the upward movement of the upper section relatively to the lower one under the action of the springs 13, pins or screws 17 on the lower section are arranged to engage with suitable stop shoulders 18 on the guide-pins, as shown in Fig. 3. These guide-pins in the present case are made tubular to receive the upper ends of the springs 13, which latter at their lower ends are located in the guide openings 16 in the lower section. In this way the springs are housed and protected from injury.

Figure 2:
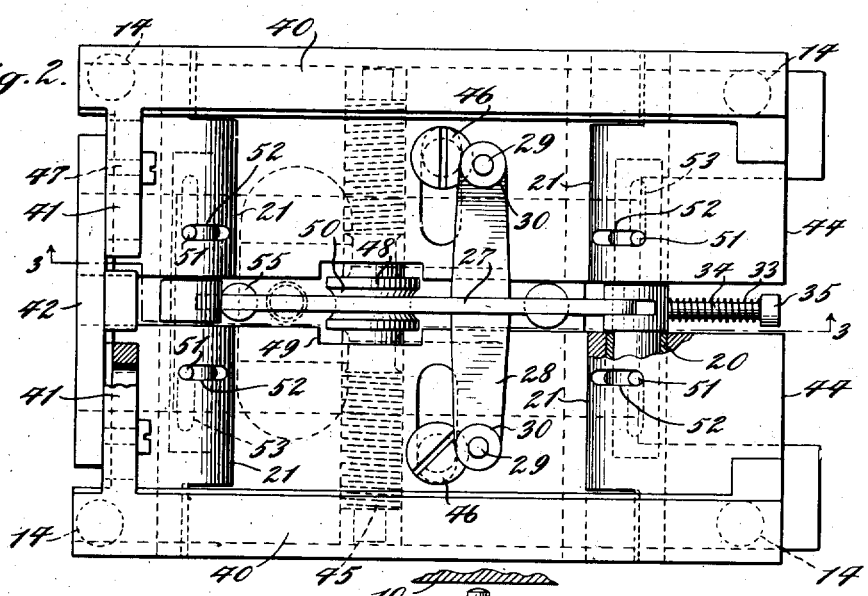
Fig. 2 is an enlarged plan view of the box-form removed from the carrier, with part of the same broken away for the clearer illustration of certain of the parts.

The upper section of the form is yieldingly held relatively to the lower one and its actuating carrier during the upward movement of the form until the latter reaches a point in close proximity to the upper presser member 10, say to a point within approximately one-quarter of an inch therefrom or so close as to prevent the entry of a person's hand or fingers, at which time it is necessary to render said upper section rigid or unyielding relatively to the lower one, whereby it will be caused to exert the necessary pressure upon the interposed work. The means here shown for doing this comprise two pairs of rocking members 20, 20, suitably journalled in transversely arranged bearings 21, 21, in the lower section adjacent opposite ends thereof, as shown in Fig. 2, which members are provided at their outer ends with eccentric portions 22, adapted to be rocked to and from a supporting position beneath foot extensions 23 of the upper form section.

As a means for rocking these members to and from their supporting positions at the desired time in the operation of the machine, each pair is connected, in a manner to be herinafter described, with an intermediate rock-shaft 25. These rock-shafts are provided with crank arms 26 which are connected by a link 27, which latter as here shown, is provided with a cross-arm 28 carrying at its opposite ends two vertically arranged operating members 29 which project slightly above the upper surface of the form, as shown. As a means to guide the link 27 and hold it against lateral displacement, it is engaged by two forked studs 55, 55, on the lower form section.

Figure 4:
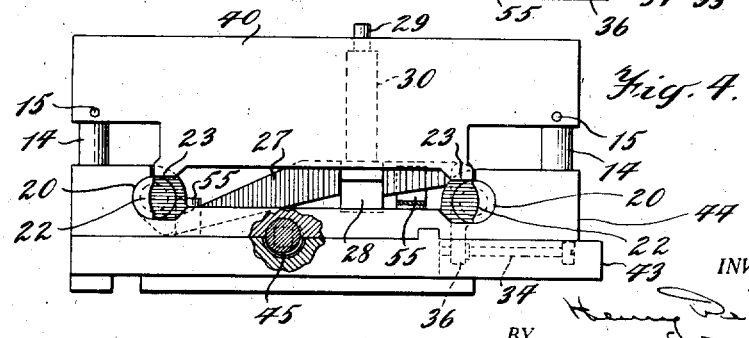
Fig. 4 is a side elevation of the same on a reduced scale, with a part of the lower section broken away to more clearly show the connection therewith of the adjusting screw for varying the width of the form.
Figure 5:
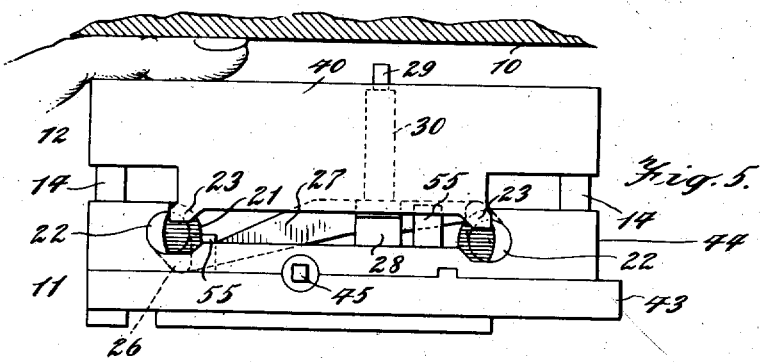
Fig. 5 is a similar view, showing the raised position of the lower form section relative to the upper one which takes place upon the upper section being stopped in its normal movement by some extraneous object, such as the operator's finger, being caught between the form and the upper co-operating presser member.
Figure 6:
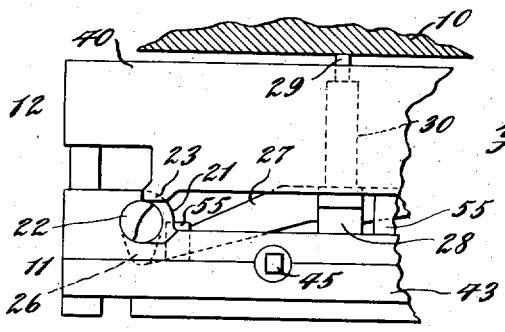
Fig. 6 is a similar view, partly broken away, showing the connection or support between the lower and upper sections in the operative position it is caused to assume in the normal operation of the machine just before the box-form reaches its work-pressing position.

During the upward movement of the box-form, the supporting members 22 will be maintained in their inoperative position, as shown in Figs. 3 and 4, whereby the upper form section may yield relatively to the lower one, until the operating members 29 come into contact with the upper presser member 10, either directly or through an interposed end blank, after which continued upward movement of the form will cause said operating members 29 to act through the described connecting linkage with the supporting members 22, to rock the latter to their operative supporting position beneath the extensions 23 of the upper form section, as shown in Fig. 6. When thus supported, the upper form section becomes rigid or unyielding with relation to the lower one and is therefore caused, upon the continued upward movement of the form, to co-operate with the upper member to exert the required pressure upon the interposed work. If, however, an obstruction of greater thickness than the length of the projecting ends of the operating members 29, such, for instance, as the operator's hand or fingers, becomes accidently located between the box-form and the upper presser member during the upward movement of the box-form, the upper form section will be stopped in its movement upon the obstruction contacting with the upper presser member 10 and thereby permit the eccentric supporting members 22 carried by the lower form section to be moved up past the lower ends of the feet 23 of the upper section to a position opposite the outer ends thereof, as shown in Fig. 5, where they will be held inoperative and against rocking movement when the operating members 29 are subsequently brought into engagement with the upper presser member 10. Because of the supporting members being held against rocking movement in this way, a yielding connection is provided between the same and the operating members 29 in order to prevent damage or breakage to the parts when said operating members are forced upward into engagement with the presser 10. This yielding connection as here shown is provided by making said operating members in the form of pins which are slidably mounted for vertical movement within tubular arms 30 on the cross-arm 28 and locating springs 31 within said arms upon which the pins are seated, as clearly shown in Fig. 3. These springs are made stiff enough to assure proper operation of the supporting members 22 from the pins 29 when there is no interference with the normal working of the machine, but they will yield sufficiently to prevent breakage of the parts when the upper form section is stopped by an obstruction in the manner referred to.

Upon the descent of the box-form following its pressing engagement with the work, the supporting members 22 will be returned to their inoperative positions of disengagement with the upper form section by suitable automatic means. This means comprises a spring 33 which is mounted on a pin 34 attached to the lower form section and is adapted to expand between a head 35 on said pin and a lever arm 36 depending from one of the rock-shafts 25. Pressure of this spring against the lever arm 36 will rock both shafts 25, through the connection 27, to return the connected supporting members 22 to their inoperative positions, shown in Figs. 3 and 4, as soon as the pins 29 are lowered from engagement with the presser member 10.

The box-form may be made up in any suitable or desired way. As here shown, it is made adjustable to receive box blanks of different sizes. In providing for this adjustment, the upper form section 12 is made up of a pair of laterally adjustable side members 40, 40, having inwardly projecting extensions 41 at one end slidably connected with an end member 42, and the lower section 11 is made up of a base 43, adapted for attachment to the carrier 8, and a pair of plates 44, 44, slidably mounted thereon for lateral adjustment; these plates 44 on the base 43 being provided to carry the lower ends of the connections between the upper and lower form sections, such as the guides 14 and rocking supports 22.

As a means for adjusting the width of the form, an endwise-stationary screw 45 is provided, having right and left hand screw threads engaging the opposite plates 44, 44. Rotary movement being imparted to this screw, as by means of a wrench applied to either of its squared ends, will cause a lateral movement of the opposite sides of the form toward or from each other, as desired. After the desired adjustment of the form has been effected, the parts may be secured in adjusted position by suitable fastening means, such as the screws 46, which engage the lower plates 44, and the screws 47, which connect the extensions 41 of the upper members 40 with the end member 42. An annular collar 48 at the center of the screw 45 engages the base 43 within an opening 49 therein to hold the screw against endwise movement. The peripheral groove 50 shown in this collar is provided to permit of the vertical movement of the link 27 when being operated to rock the supporting members 22.

Figure 7:
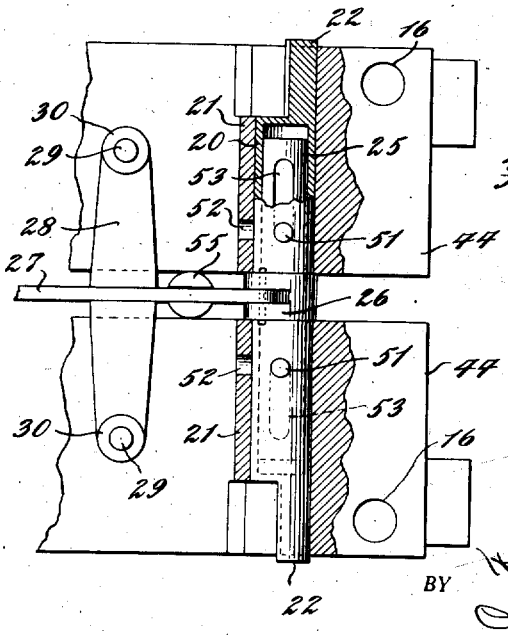
Fig. 7 is a sectional detail showing the adjustable connection between certain parts of the supporting devices for holding the upper form section rigid relative to the lower one.

As hereinbefore referred to, each pair of the supporting members 22 are connected with an intermediate shaft 25 by which they are rocked to and from their operative supporting positions. This connection is made by forming the inner or adjacent ends of said members with tubular portions to receive the opposite ends of the shafts and connecting such parts with transversely arranged pins 51. These pins at one end extend into short slots 52 in the bearings 21 on the adjustable plates 44 of the lower form section, which slots extend transversely of the axis of the supports 20. In this way a connection is made between the supporting members and the plates 44 which will cause the same to move together upon any lateral adjustment of the form such as hereinbefore described. To permit of such adjustment of the supporting members relatively to each other and to the connecting shafts 25, the openings 53 in the shafts through which the pins extend are made elongated, as shown in Fig. 7. If the form was not adjustable, as described, each pair of the supporting members and their intermediate connection could of course be made in one part.

In the present instance, the rocking supporting members are held to their normal inoperative positions under the action of the spring 33, by the engagement of the pins 51 with the end walls of the slots 52, as shown in Fig. 2.

The expression "pressure applying elements" appearing in certain of the following claims, is used to designate elements corresponding to the opposing bed and head of a press, such, for example, as the parts herein indicated by the reference numerals 8 and 10.

What I claim is:

1. In a machine of the kind described, the combination with two cooperating presser members and their supports, and an actuator for reciprocating one of said members toward and from the other, of a connection between one of the presser members and its support which is capable of being rendered operative and inoperative to maintain the member unyielding relatively to its support, and means for controlling the action of the connection to render it operative just prior to pressing engagement of the work by the presser members, said means including an operating member carried by one presser and actuated by engagement with the other.

2. In a machine of the kind described, the combination with two cooperating presser members and their supports, and an actuator for reciprocating one of said members toward and from the other, of a rocking connection between one of the presser members and its support which is capable of being rendered operative and inoperative to maintain the member unyielding relatively to its support, and means for controlling the action of the connection to render it operative just prior to pressing engagement of the work by the presser members, said means including an operating member carried by one presser and actuated by engagement with the other.

3. In a machine of the kind described, the combination with two cooperating presser members and their supports, and an actuator for reciprocating one of said members toward and from the other, of a plurality of rocking connections between one of the presser members and its support which are capable of being rendered operative and inoperative to maintain the member unyielding relatively to its support, and means for controlling the action of the connections to render them operative just prior to pressing engagement of the work by the presser members, said means including an operating member carried by one presser and actuated by engagement with the other.

4. In a machine of the kind described, the combination with two cooperating presser members and their supports, and an actuator for reciprocating one of said members toward and from the other, of a connection between one of the presser members and its support which is capable of being rendered operative and inoperative to maintain the member unyielding relatively to its support, and means for controlling the action of the connection to render it operative just prior to pressing engagement of the work by the presser members, said means including an operating member carried by one presser and actuated by engagement with the other, and a yielding connection between said operating member and the connection operated thereby.

5. In a machine of the kind described, the combination with two cooperating presser members and their supports, and an actuator for reciprocating one of said members toward and from the other, of means yieldingly holding one of the members in a normally projected position beyond its support, a connection between said yieldingly-held member and its support which is capable of being rendered operative and inoperative to maintain the member unyielding relatively to its support, and means for controlling the action of the connection to render it operative just prior to pressing engagement of the work by the presser members, said means including an operating member carried by one presser and actuated by engagement with the other.

6. In a machine of the kind described, the combination with two cooperating presser members and their supports, and an actuator for reciprocating one of said members toward and from the other, of a connection between one of the presser members and its support which is capable of being rendered operative and inoperative to maintain the member unyielding relatively to its support, and means for controlling the action of the connection to render it operative just prior to pressing engagement of the work by the presser members, said means including an operating member carried by one presser and actuated by engagement with the other and means for automatically rendering the connection inoperative following the work-performing operation of the presser members.

7. In a machine of the kind described, the combination with two cooperating presser members and their supports, and an actuator for reciprocating one of said members toward and from the other, of a rocking connection between the reciprocating member and its support which is capable of being rendered operative and inoperative to maintain the member unyielding relatively to its support, means for controlling the action of the connection to render it operative just prior to pressing engagement of the work by the presser members, said means including an operating member carried by the reciprocating presser and actuated by engagement with the other, and means for automatically rendering the connection inoperative following the work-performing operation of the presser members.

8. In a box-ending machine, the combination with the presser-head and the reciprocating box-form carrier movable toward and from said head, of a box-form mounted on said carrier comprising lower and upper sections, the upper section being divided into parts adjustable relatively to each other to vary the size of the form, means yieldingly holding the upper divided section in a normally projected position above the lower one, a connection between said sections permitting of the said adjustment of the upper one and capable of being rendered operative and inoperative to maintain the upper section unyielding relatively to the lower one, and means for controlling the action of the connection to render it operative just prior to the box-form reaching the end of its working stroke.

9. In a box-ending machine, the combination with the presser-head and the reciprocating box-form carrier movable toward and from said head, of a box-form mounted on said carrier comprising lower and upper sections divided into parts which are adjustable relatively to each other to vary the size of the form, means yieldingly holding the upper section in a normally projected position above the lower one, a connection between said sections permitting of their adjustment and capable of being rendered operative and inoperative to maintain the upper section unyielding relatively to the lower one, and means for controlling the action of the connection to render it operative just prior to the box-form reaching the end of its working stroke, said means including an operating member carried by the box-form and actuated by engagement with the presser-head.

10. In a box-ending machine, the combination with the upper presser-head and the reciprocating box-form carrier movable toward and from said head, of a box-form mounted on said carrier comprising lower and upper sections divided into parts which are adjustable relatively to each other to vary the size of the form, means yieldingly holding the upper divided section in a normally projected position beyond the lower one, supports carried by the lower section movable to and from an operative position for engaging the upper section to hold it unyielding relatively to the lower one, said supports having connection with the box-form sections in a manner permitting of their said adjustment and means for shifting the supports to operative position just prior to the box-form reaching the end of its working stroke.

11. In a box-ending machine, the combination with the upper presser-head and the reciprocating box-form carrier movable toward and from said head, of a box-form mounted on said carrier comprising lower and upper sections, means yieldingly holding the upper section in a normally projected position beyond the lower one, rocking supports carried by the lower section movable to and from an operative position for engaging the upper section to hold it unyielding relatively to the lower one, a linkage connecting said supports for moving them in unison, and means for moving the supports to operative position just prior to the box-form reaching the end of its working stroke.

12. In a box-ending machine, the combination with the upper presser-head and the vertically reciprocating box-form carrier movable toward and from said head, of a box-form mounted on said carrier comprising lower and upper sections, means yieldingly holding the upper section in a normally projected position beyond the lower one, rocking supports carried by the lower section movable to and from an operative position for engaging the upper section to hold it unyielding relatively to the lower one, a linkage connecting said supports for moving them in unison, means for rocking the supports to operative position just prior to the box-form reaching the end of its working stroke, said means including an operating pin associated with the linkage and projecting beyond the upper surface of the box-form for engagement with the presser-head and means for automatically returning the rocking supports to inoperative position upon the downward or return movement of the box-form.

13. A box-form for machines of the kind described, comprising two sections, means yieldingly holding one section in a normally projected position beyond the other, a connection between the two sections capable of being rendered operative and inoperative to maintain one section unyielding relatively to the other, and means for controlling the action of the connection to render it operative.

14. A box-form for machines of the kind described, comprising two sections, means yieldingly holding one section in a normally projected position beyond the other, a rocking connection between the two sections capable of being rendered operative and inoperative to maintain one section unyielding relatively to the other, and means for controlling the action of the connection to render it operative and inoperative.

15. A box-form for machines of the kind described, comprising two sections, means yieldingly holding one section in a normally projected position beyond the other, a rocking connection between the two sections capable of being rendered operative and inoperative to maintain one section unyielding relatively to the other, and means for controlling the action of the connection to render it operative and inoperative, said means including an operating member projecting beyond one of the sections for engagement with actuating means.

16. A box-form for machines of the kind described, comprising two sections, one of which is divided into parts adjustable relatively to each other for varying the size of the form, means for adjusting said parts relatively to each other, means yieldingly holding the divided section in a normally projected position beyond the other one, a connection between said sections permitting of their adjustment and capable of being rendered operative and inoperative to maintain one section unyielding relatively to the other, and means for controlling the action of the connection to render it operative and inoperative.

17. In combination with a pressure applying element, a form as characterized, comprising a base, side and end walls suitably supported thereon and adapted to yield under pressure, and means positioned on said base and engageable with said walls to prevent them from yielding, said means adapted to be actuated by said pressure element upon its approximation to the walls.

18. In combination with pressure applying elements, a form as characterized, comprising a base, a wall yieldingly supported thereon, and a locking element on said base adapted to be engaged with said wall to prevent yielding thereof said element adapted to be actuated by an approaching pressure applying element.

19. In a form as characterized, a base, walls yieldingly supported thereon, locking elements adapted to be engaged with said walls to prevent movement thereof, and actuating means operatively connected with said elements and extending a spaced distance above the walls.

20. In a form as characterized, a base, parallel side walls and an end wall suitably supported thereon and adapted to be depressed perpendicularly relative thereto, and locking elements disposed on said base and adapted to be projected under said walls to prevent depression thereof.

21. In a device as characterized, a base, a work supporting member erected thereon and resiliently supported a spaced distance thereabove and an element movable to a position under said member to rigidly uphold same.

22. In combination with pressure applying elements, a device as characterized, comprising a base, a work supporting member erected thereon and adapted to yield upon the premature application of pressure thereto, and an element associated with said base and adapted to be engaged with said member to prevent its yielding, said element adapted to be actuated by pressure exerting means upon its approximation to said member.

23. In combination with a pressure applying element, a form adapted to support work to be subjected to pressure, and comprising a base on which a supporting member is yieldingly upheld, the construction and arrangement being such that if an extraneous object is interposed between the form and an approaching pressure element said supporting member will yield and the object will not be subjected to destructive pressure, and a locking element associated with the base and adapted to be actuated by said pressure element upon its approximation to the form to prevent the supporting member from yielding.

24. In a form as characterized, a base, walls supported thereon and adapted to normally yield under pressure and a member positioned on said base and movable into engagement with said walls to prevent depression thereof.

25. In a form as characterized, a base, walls yieldingly supported thereon, means adapted to prevent yielding of said walls, and actuating means operatively connected with said preventive means and extending a spaced distance above the walls.

26. In a form as characterized, a base, a frame slidably disposed thereon and adapted to be adjusted laterally thereon to and from the center thereof, a work supporting member carried by said frame, said member being adapted to yield under prematurely applied pressure, and means adapted to be actuated by an approximating pressure element to prevent the members yielding.

27. A form as characterized, a base, a pair of frames slidably disposed thereon and adapted to be adjusted laterally thereon to and from the center thereof, work supporting members carried by each of said frames, said members being adapted to yield under prematurely applied pressure, and means adapted to be actuated by an approximating pressure element to prevent the members yielding.

28. In a form as characterized, a base, side and end walls suitably supported thereon, said walls adapted normally to yield vertically under moderate pressure, means for applying pressure vertically to said walls, and means to prevent depression of the walls under pressure, the last named means adapted to be actuated by the first named means upon its close approximation to the top of the walls.

Signed at Rochester, in the county of Monroe, and State of New York, this 21st day of October, 1921.

HENRY DE SMITH.

Witnesses:

ROSAMONDE FAHY,
GLADYS M. FREAR.